United States Patent [19]
Somma

[11] Patent Number: 5,848,562
[45] Date of Patent: Dec. 15, 1998

[54] SIDE OPERATED CLAMP FOR RESHARPENABLE INSERT TOOL HOLDER

[75] Inventor: Herman R. Somma, Waterbury, Conn.

[73] Assignee: Somma Tool Company, Inc., Waterbury, Conn.

[21] Appl. No.: 739,026

[22] Filed: Oct. 28, 1996

[51] Int. Cl.⁶ .................................................. B23B 27/06
[52] U.S. Cl. ............................... 82/158; 82/13; 407/108
[58] Field of Search ..................... 407/102, 106, 407/107, 108, 112; 82/158, 13

[56] References Cited

U.S. PATENT DOCUMENTS

| Re. 21,068 | 5/1939 | Miller | 407/108 |
|---|---|---|---|
| 2,659,963 | 11/1953 | Severson | 407/108 |
| 4,174,916 | 11/1979 | Kezran | 407/108 |
| 4,418,593 | 12/1983 | Frydel | 82/158 |
| 5,345,846 | 9/1994 | Somma | 82/13 |
| 5,345,864 | 9/1994 | Somma | 82/13 |

*Primary Examiner*—Steven C. Bishop
*Assistant Examiner*—Mark Williams
*Attorney, Agent, or Firm*—William C. Crutcher

[57] ABSTRACT

A side operated clamp for a resharpenable insert tool holder includes a clamping member movable into a converging recess on the tool holder body to clamp the tool insert against a shelf on the tool holder body. An actuator is movable transversely in a transverse slot extending across the tool holder. A threaded member is rotated to cause the actuator to move. The actuator has a projecting portion fitting into a dovetail keyway on the clamping member. The keyway is inclined to the transverse axis to cause clamping/unclamping movement when the actuator moves in the transverse slot.

16 Claims, 3 Drawing Sheets

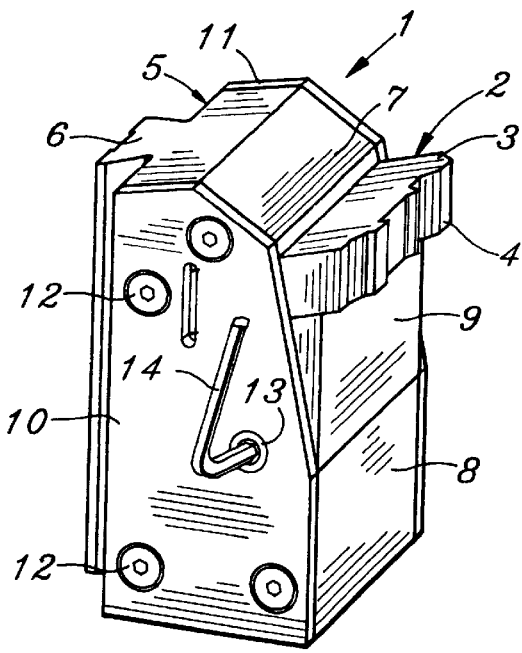
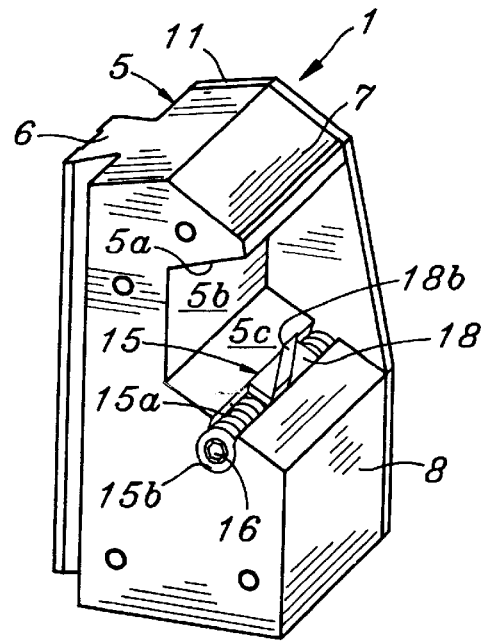
Fig.1
Fig.2
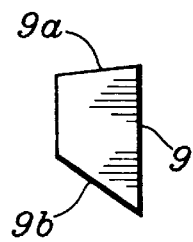
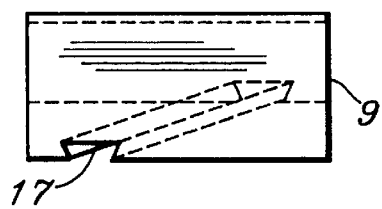
Fig.3a
Fig.3b
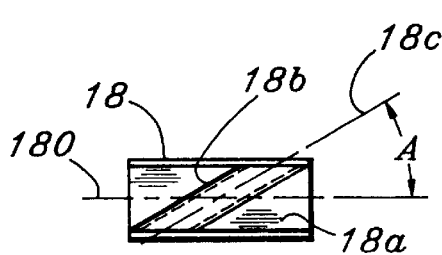
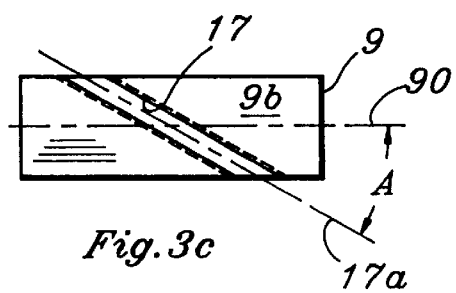
Fig.4a
Fig.3c
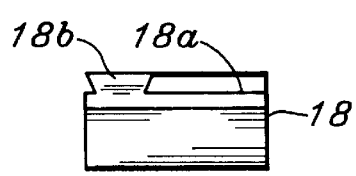
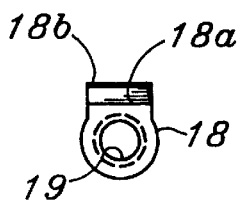
Fig.4b
Fig.4c

SIDE OPERATED CLAMP FOR RESHARPENABLE INSERT TOOL HOLDER

BACKGROUND OF THE INVENTION

This invention relates generally to tools and tool holders for metal working, and more particularly to an improved side operated clamp for resharpenable insert tool holder.

An improved tool holder with a resharpenable form tool insert is disclosed in my U.S. Pat. No. 5,345,846 dated Sep.13, 1994 and assigned to Somma Tool Company. In that patent, a form tool was shown for a rotating workpiece, which included a removable resharpenable tool insert, a tool holder with a recess for receiving the insert, and an adjustable clamping support which was designed to raise and relocate the insert in the tool holder recess after each resharpening. The tool insert support comprised one or more wedge-shaped members drawn into the recess with bolts, serving to clamp the resharpenable insert against the rear wall and the top shelf of the tool holder. Clamping and unclamping the wedgeshaped members requires loosening and tightening the bolts located on the front side of the tool facing the workpiece. Very often several different tools and tool holders are located around the workpiece, causing a congested area and consequent difficulty in reaching the bolts to clamp and unclamp the tool inserts. It would be desirable to provide a different type of clamping mechanism which is more accessible.

Accordingly, one object of the present invention is to provide an improved clamping mechanism for a resharpenable tool insert in a tool holder.

Another object of the invention is to provide an improved side operated clamping mechanism for a form tool with a removable resharpenable tool insert.

SUMMARY OF THE INVENTION

Briefly stated, the invention comprises an improved side actuated clamping device for a tool holder of the type which is adapted to receive and clamp a resharpenable tool insert in a recess, the recess defined by a top shelf, a rear wall and bottom wall with a planar surface, the recess converging toward the rear wall, wherein the improved clamping device comprises a transverse slot in the bottom wall planar surface extending transversely across the recess, an actuator having a longitudinal axis and disposed in the transverse slot so as to be movable along its longitudinal axis, the actuator having a dovetail or key protruding above the bottom wall planar surface forming an angle with the actuator longitudinal axis, means operable from the side of the tool holder recess to move the actuator in the transverse slot, and a clamping member with a top wall and a bottom planar wall arranged to slide on the tool holder bottom planar wall perpendicular to a transverse line across the clamping member so as to clamp a tool insert between its top wall and the top shelf, the clamping member having a dovetail slot or keyway slot receiving the actuator dovetail or key, the axis of the slot also forming a corresponding angle with the transverse line across the clamping member.

Preferably the clamping member top wall and the top shelf of the tool holder also have planar surfaces suitable for receiving a tool insert designed according to my U.S. Pat. No. 5,345,846.

A preferred means for moving the actuator in the transverse slot comprises a restrained threaded member operable from the side of the tool holder, extending through a threaded hole in the actuator, and parallel to the actuator longitudinal axis.

DRAWING

The subject matter which is regarded as the invention is particularly pointed out and distinctly claimed in the concluding portion of this specification. The invention, however, both as to organization and method of practice, together with further objects and advantages thereof, may best be understood by reference to the following description, taken in connection with the accompanying drawing, in which:

FIG. 1 is a perspective view of my improved tool holder with a side actuated clamping device, shown during the clamping/unclamping process, FIG. 2 is a perspective view of the tool holder partially disassembled, FIGS. 3a, 3b and 3c are end elevation view, front elevation view, and bottom plan view, respectively, of the clamping member, FIGS. 4a, 4b and 4c are top plan view, side elevation view and end elevation view, respectively, of the actuator, FIGS. 5 and 6 are side elevation views, in cross section, taken through the center of the tool holder along lines V—V and VI—VI respectively, of FIGS. 7 and 8, illustrating the clamping member and actuator in two different positions before and after sharpening the tool insert, FIGS. 7 and 8 are partial views taken along lines VII—VII and IIX—IIX of FIGS. 5 and 6 respectively in the plane of the bottom wall 5c, looking at the actuator from the tool holder recess, FIG. 9 is a partial side elevational view, in cross section, of a first modification, and FIG. 10 is a partial side elevational view, in cross section, of a second modification.

DESCRIPTION OF THE PREFERRED EMBODIMENT

Figure 5:
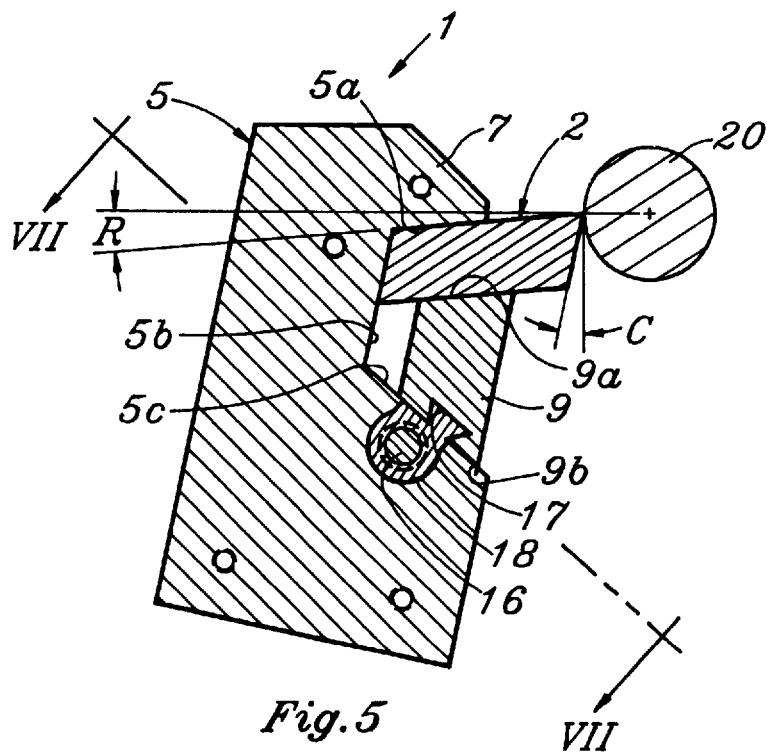

Referring now to FIG. 1 of the drawing, a tool holder shown generally as 1 is designed to receive a removable resharpenable form tool insert shown generally at 2. Insert 2 includes a top planar surface 3, a front contoured forming tool face 4 and is constructed according to my U.S. Pat. No. 5,345,846, incorporated herein by reference.

Tool holder 1 includes a tool body 5, which is positioned by means of a dovetail 6 formed at the back, and includes a top shelf 7, the underside 5a of which (See FIG. 2) receives top planar surface 3 of insert 2. The front side 8 of tool holder body 5 is recessed to contain a clamping member 9. Clamping member 9 is restrained on either side from moving transversely across the tool holder by means of a sidewall 10 and a spaced sidewall 11. Sidewalls 10 and 11 are bolted to the tool holder body by cap screws 12. A hole 13 in sidewall 10 permits the insertion of a manually actuated hex wrench 14 from the accessible side of the tool holder 1. Operation of wrench 14 operates an actuator (See FIG. 2) which moves clamping member 9 toward or away from the rear of the tool holder in a manner to be described.

Referring to FIG. 2 of the drawing, a view is shown of the tool holder 1 partially disassembled with the tool insert 2 and clamping member 9 removed and without sidewall 10. The tool body 5 has a section removed from the body, leaving a top planar wall 5a beneath shelf 7, an adjoining rear wall 5b, and a bottom planar wall 5c. Walls 5a, 5b, 5c, together with the side plates 10, 11, together define an open recess facing the workpiece. The planar walls 5a, 5cconverge toward the rear of the recess.

A transverse slot 15 with a slot opening 15a joining an enlarged semi-cylindrical passage 15b serves as an actuator retaining guide slot. Slot 15 extends transversely across the bottom wall 5c. A threaded member 16 is disposed in the actuator slot 15 and also extends transversely across the tool holder. The threaded member has a hex socket 16a at one end and a bearing cap 16b at the other end. An actuator 18 to be described in further detail is retained in slot 15 and is engaged with the threaded member 16.

FIGS. 3a, 3b and 3c illustrate a preferred construction of the clamping member 9. Clamping member 9 is a prism-shaped member with a top planar wall 9a and a bottom planar wall 9b. A dovetail slot 17 with an axis 17a is cut into the bottom planar wall 9b. The axis of dovetail slot 17 forms an angle A with a transverse line 90 extending transversely across the bottom planar wall 9b of clamping member 9.

Referring to FIGS. 4a, 4b and 4c, the actuator 18 is shown as comprising a longitudinal member having a longitudinal axis 180 with a threaded hole 19 running along its longitudinal axis, which is designed to receive the threaded member 16. The cross section of actuator 18 corresponds to the cross-sectional shape of slot 15 and actuator retaining guide slot 15a. The actuator 18 has a top surface 18a, from which projects a dovetail 18b. Dovetail 18b of the actuator slides in dovetail slot 17 of the clamping member. An axis of dovetail 18b forms an angle A with the projected longitudinal axis 180 of the actuator 18.

Figure 6:
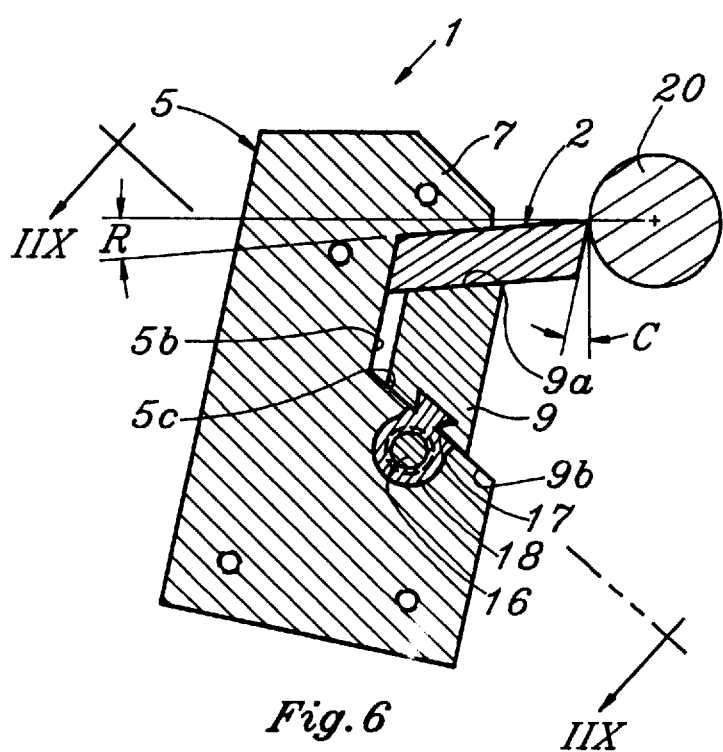

Referring now to FIGS. 5 and 6 of the drawing, cross sections taken through the center of the tool holder 1 are shown illustrating the clamping member 9 and actuator 18 in two different positions, before and after sharpening the removable form tool insert 2. In both views, the form tool insert 2 is clamped into the body 5 of the tool holder by the clamping member 9. The form tool insert 2 is designed according to my U.S. Pat. No. 5,345,846 to have a rake angle "R" and a clearance angle "C". Tool holder body 5 is oriented such that the form tool insert 2 will cut a profile on a rotating workpiece 20.

In the left hand view of FIG. 5, clamping member 9 is disposed toward the outer part of the recess. In the right hand view of FIG. 6, form tool insert 2 has been removed and sharpened so that it is appreciably thinner. Clamping member 9 is shown in a position moved inward between the converging walls of the recess toward the rear wall 5b. In order to effect this movement of clamping member 9, the actuator 18 has been moved to a new position in slot 15 by rotation of the threaded member 16. This causes a cooperative action between dovetail 18b on the actuator and dovetail slot 17 in the clamping member which are both inclined at the same angle A to the transverse axis. This inclination angle A provides a force component on clamping member 9 parallel to planar wall 5c and perpendicular to transverse line 90 on the clamping member in the direction of rear wall 5b.

Figure 7:
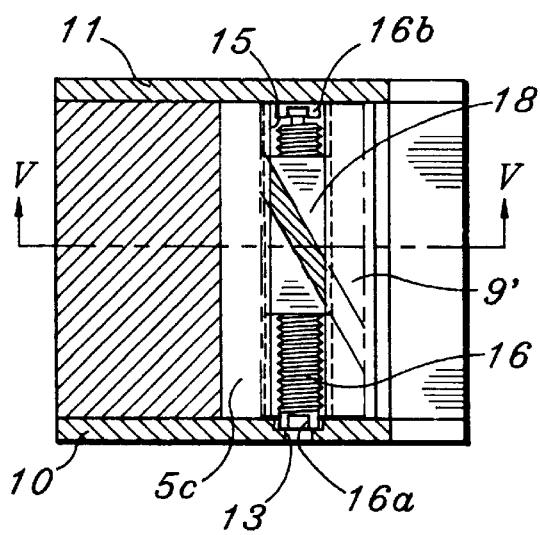
Figure 8:
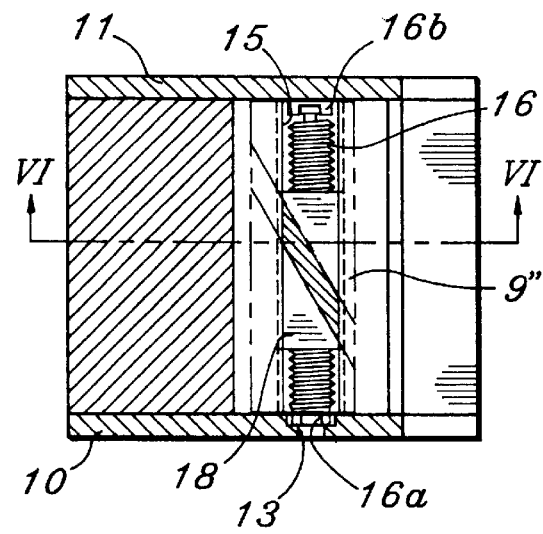

The view of FIG. 7 corresponds to FIG. 5 and the view of FIG. 8 corresponds to FIG. 6. The views of FIG. 7 and FIG. 8 are taken perpendicular to the planar wall 5c. FIG. 8 illustrates the actuator 18 moved toward sidewall 10 (clamping) by clockwise rotation of the threaded member 16. Threaded member 16 is rotated by means of the manual actuator inserted into the hex socket 16a. Threaded member 16 must be restrained between sidewalls 10, 11 in order to cause actuator 18 to move transversely in slot 15. Rotation of threaded member 16 against the restraint of wall 11 is facilitated by a bearing cap 16b attached to the rotating member 16. FIG. 7 shows the actuator 18 moved toward sidewall 11 (unclamping) by counterclockwise rotation of the hex wrench.

The threaded member 16 is contained on both ends by the side plates 10, 11. The shape of the actuator and the slot it rides in prevent it from rotating. Therefore, when the right hand threaded screw is rotated clockwise, the actuator 18 will move toward sidewall 10. Conversely when the screw is rotated counter-clockwise the actuator will move toward sidewall 11.

The clamping member 9 is also contained on both ends by the side plates. Therefore, as the actuator moves toward sidewall 10, the clamp will move inward in the recess, clamping the tool insert 2 in place, as shown in FIG. 8 by the phantom lines 9". When the actuator moves toward sidewall 11, the actuator moves outward unclamping the insert, as shown in FIG. 7 by the phantom lines 9'.

The length of the actuator 18 has to be less than the transverse dimension clamping member 9 so that it can move across the clamping member. The angle "A" of the key has to be such that in conjunction with the sideways movement permitted by the difference between the length of the actuator and the transverse dimension of the clamp it will move the clamp outward enough to unclamp a full size resharpenable tool insert and inward enough to still clamp the tool insert when it has been resharpened down to the minimum thickness it can be ground to for maximum resharpenable tool insert usage.

OPERATION

Clamping and unclamping from the side of tool holder 1 is effected by inserting the hex wrench 14 in the hex socket 16a of threaded member 16 and rotating in the appropriate direction. Since movement of threaded member 16 in the transverse direction is restrained by sidewalls 10, 11, actuator 18 will be forced to travel transversely in slot 15. The dovetail portion 18b is contained within the dovetail slot 17 of clamping member 9. Since the dovetail slot and dovetail are both inclined at an angle A with respect to the longitudinal axis of the actuator and the transverse line on the clamping member, respectively, transverse movement of the actuator effects a component of force parallel to the planar surface 5c. Since clamping member 19 is also restrained at its ends by the walls 10, 11, it may only travel toward or away from the rear wall 5b, moving along perpendicular to transverse line 90 the planar surface 5c.

Angle A may vary and may be selected, depending upon the length of actuator 18 and the length of slot 15. If the length of the actuator is one-half of the slot length, an appropriate value for angle A is 30° to obtain full slot travel. Angle A may be varied to suit the application but should not be made so large that excessive longitudinal forces are required to obtain the proper force component toward or away from the rear wall of the tool holder. Since the clamping member ends must slide on one or the other of the side walls 10, 11, suitable grooving may be added, if desired, to reduce frictional forces.

MODIFICATIONS

The cooperating members 18b and 17 on the actuator and the clamping member have been illustrated in the preferred embodiment as cooperating dovetail members so that they will remain engaged when the tool insert 2 is removed. However the invention would perform equally well and it is within the scope of the present invention to utilize any appropriate type of key and keyway slot in place of the dovetail and dovetail slot.

Similarly, slot 15 has been illustrated in the preferred embodiment with a round actuator retaining enlarged passage 15b. 15b could be in any desired shape such as a simple dovetail slot, in which case the body of actuator 18 would be correspondingly modified to mate with the actuator guide slot shape.

While the preferred embodiment of the invention illustrates the actuator 18 and threaded member 16 permanently retained in slot 15, it would also be possible to utilize a simple slot shape without an enlarged passage such as 15b, with the shape of the actuator cross section correspondingly adjusted.

Figure 9:
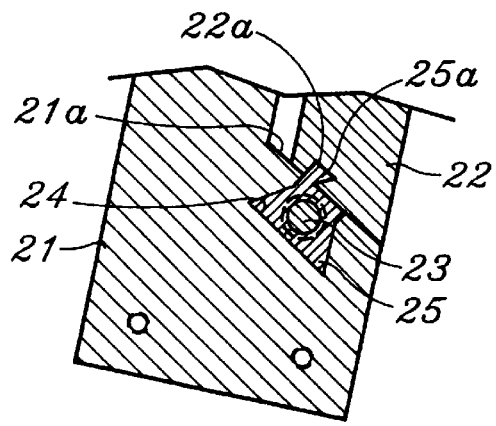
Figure 10:
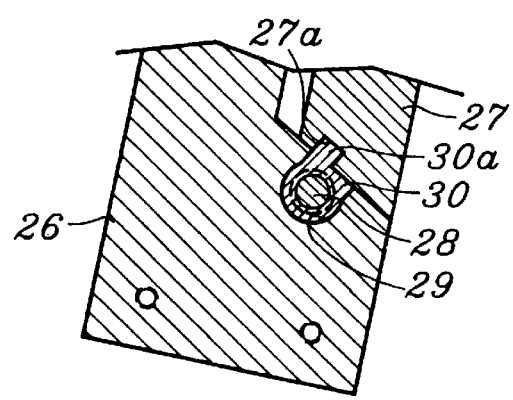

In order to illustrate these alternative arrangements, FIGS. 9 and 10 show two other modifications. FIG. 9 is a cross section similar to FIG. 5 showing only a partial view of a tool holder body 21 and clamping member 22. A threaded member 23 performs as previously described. The transverse slot in the tool holder body 21 has been modified to a dovetail slot 24. An actuator 25 has a corresponding dovetail cross section matching the slot 24. Clamping member 22 includes an inclined dovetail slot 22a as previously described. The actuator 25 has a dovetail portion 25a extending above the planar surface of the tool holder illustrated by wall 21a. Dovetail 25a and dovetail slot 22a are inclined at the same angle with respect to the transverse axis.

FIG. 10 illustrates another modification with simple keys and keyway slots. Portions are shown of a tool holder 26 and clamping member 27. A threaded member 28 operates as previously described. Transverse slot 29 is cut in the tool holder body to receive an actuator 30 having a similar cross-sectional shape and having internal threads matching those of the threaded member 28. Actuator 30 includes a simple protruding projection 30a. Projection 30a may be a short peg, or it may be a full length key which is inclined with respect to the transverse axis of the tool holder body. Clamping member 27 includes a correspondingly shaped keyway slot 27a inclined with respect to the transverse axis. The modification shown in FIG. 10 would permit clamping member 27 to be removed and would also permit actuator 30 and threaded member 28 to be removed without removal of the sidewalls.

The terms "top" and "bottom" used herein are relative terms used with respect to the illustrations and not intended to limit the claims when the tools are positioned in other orientations. Also, while the invention has been described in connection with a removable and resharpenable form tool insert according to my U.S. Pat. No. 5,345,846, the invention may be utilized with any type of clampable tool insert where, because of a congested condition, it is desired to effect the clamping and unclamping action from the side of the tool holder.

While there has been described what is considered to be the preferred embodiment of the invention, other modifications will occur to those skilled in the art, and it is desired to secure in the appended claims all such modifications as fall within the true spirit and scope of the invention.

I claim:

1. Improved side actuated clamping device for a toolholder adapted to receive and clamp a resharpenable tool insert in a recess, the recess defined by a top shelf, spaced sidewalls, a rear wall joining said top shelf, and a bottom wall with a planar surface joining said rear wall, the recess converging toward said rear wall, the improved clamping device comprising:

a transverse slot having a slot opening defined in the bottom wall planar surface and extending transversely across the recess, an actuator having a longitudinal axis, said actuator disposed in said transverse slot and adapted to traverse the slot along its longitudinal axis, said actuator having a portion protruding above the bottom wall planar surface, means for moving said actuator in said transverse slot, and a clamping member having a top wall and a bottom planar wall arranged to slide on the toolholder bottom planar wall perpendicular to a transverse line lying in said clamping member bottom planar wall so as to clamp a tool insert between its top wall and the top shelf, said clamping member defining a slot for receiving the actuator protruding portion, the clamping member slot having an axis forming a first angle with said transverse line across the clamping member.

2. The combination according to claim 1, wherein the actuator protruding portion is a key having an axis forming a second angle with the actuator longitudinal axis, said first and second angles being substantially equal.

3. The combination according to claim 2, wherein the actuator protruding portion is a dovetail and wherein the clamping member slot is a dovetail slot.

4. The combination according to claim 1, wherein said transverse slot includes an enlarged passage joining the slot opening and extending transversely across the tool holder beneath said slot opening, and wherein the cross section of the actuator corresponds to that of the slot opening and the enlarged passage, whereby the actuator is retained in the transverse slot.

5. The combination according to claim 4, wherein the enlarged passage has a semi-cylindrical shape.

6. The combination according to claim 4, wherein the enlarged passage has a dovetail shape.

7. The combination according to claim 1, wherein the means for moving said actuator comprises a threaded member disposed in the transverse slot, and wherein the actuator includes a threaded hole receiving said threaded member, said threaded member being adapted for rotation from the side of the tool holder.

8. The combination according to claim 7, wherein the threaded member is transversely restrained by said spaced sidewalls.

9. The combination according to claim 1, wherein said clamping member is disposed between and restrained by said sidewalls.

10. Improved side actuated clamping device for a toolholder adapted to receive and clamp a resharpenable tool insert in a recess, the recess defined by a top shelf with a planar surface, spaced sidewalls, a rear wall joining said top shelf and a bottom wall with a planar surface joining said rear wall, said planar surfaces converging within the recess toward said rear wall, the improved clamping device comprising:

a transverse slot having a slot opening defined in the bottom wall and extending transversely across the recess, an actuator having a longitudinal axis, said actuator disposed in said transverse slot and adapted to traverse the slot along its longitudinal axis, said clamp actuator having a dovetail portion protruding above the bottom wall planar surface and having an axis forming a second angle with the projected actuator longitudinal axis, means operable through a sidewall of the tool holder to move said actuator in said transverse slot, and a clamping member having top and bottom planar walls forming a second angle with one another and arranged to slide on the tool holder bottom planar wall perpendicular to a transverse line lying in said clamping member bottom planar wall to clamp a tool insert between its top wall and the top shelf, said clamping member defining a dovetail slot for receiving the actuator dovetail, said dovetail slot having an axis forming a first angle with said transverse line across the clamping member bottom planar wall, said first and second angles being substantially equal.

11. The combination according to claim 10, wherein said transverse slot includes an enlarged passage joining the slot opening and extending transversely across the tool holder beneath said slot opening, and wherein the cross section of the actuator corresponds to that of the slot opening and the enlarged passage, whereby the actuator is retained in the transverse slot.

12. The combination according to claim 11, wherein the enlarged passage has a semi-cylindrical shape.

13. The combination according to claim 11, wherein the enlarged passage has a dovetail shape.

14. The combination according to claim 10, wherein the means for moving said actuator comprises a threaded member disposed in the transverse, slot, and wherein the actuator includes a threaded hole receiving said threaded member, said threaded member being adapted for rotation through a sidewall of the tool holder.

15. The combination according to claim 14, wherein the threaded member is transversely restrained by said sidewalls.

16. The combination according to claim 10, wherein said clamping member is disposed between and restrained by said sidewalls.

* * * * *